United States Patent
Komatsu

(10) Patent No.: US 6,771,952 B2
(45) Date of Patent: Aug. 3, 2004

(54) COMMUNICATION SYSTEM HAVING A CLIENT DEVICE AND AT LEAST ONE TRANSMITTING DEVICE

(75) Inventor: Yoshiaki Komatsu, Yokkaichi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 485 days.

(21) Appl. No.: 09/818,869

(22) Filed: Mar. 28, 2001

(65) Prior Publication Data

US 2001/0036848 A1 Nov. 1, 2001

(30) Foreign Application Priority Data

Apr. 28, 2000 (JP) ........................................ 2000-130264

(51) Int. Cl.[7] .............................................. H04Q 7/20
(52) U.S. Cl. ............................... 455/414.4; 455/414.3; 455/566; 455/426.1
(58) Field of Search ........................... 455/426.1, 414.1, 455/414.3, 414.4, 556.1, 556.2, 563, 566, 569.1, 90.1, 90.2, 90.3, 3.01, 3.06; 340/286.01, 286.02; 345/173, 507, 901

(56) References Cited

U.S. PATENT DOCUMENTS

| | | | | |
|---|---|---|---|---|
| 5,870,559 A | * | 2/1999 | Leshem et al. | ......... 395/200.54 |
| 5,943,399 A | * | 8/1999 | Bannister et al. | ......... 379/88.17 |
| 6,335,678 B1 | * | 1/2002 | Heutschi | ................. 340/286.02 |

FOREIGN PATENT DOCUMENTS

| | | | | |
|---|---|---|---|---|
| EP | 859500 | * | 8/1998 | ............ H04M/3/50 |
| WO | WO 97/22111 | * | 6/1997 | ............ G09G/5/00 |

* cited by examiner

Primary Examiner—Nay Maung
Assistant Examiner—Tanmay Lele
(74) Attorney, Agent, or Firm—Oliff & Berridge, PLC

(57) ABSTRACT

A communication system having a client device, a processing server and a contents server. When the client device makes a request for textual information to the processing server, the processing server searches for and receives the requested textual information from the contents server. Then, the processing server generates both abridged textual information and voice information from the received textual information, and transmits the abridged textual information to the client device. The client device requests the voice information, which corresponds to an unabridged version of the textual information, at the user's request.

15 Claims, 12 Drawing Sheets

COMMUNICATION SYSTEM HAVING A CLIENT DEVICE AND AT LEAST ONE TRANSMITTING DEVICE

BACKGROUND OF THE INVENTION

1. Field of Invention

The invention relates to a communication system that makes any desired information available, for example, to a cellular phone via the Internet.

2. Description of Related Art

There have been provided technologies to obtain various pieces of information on the Internet from cellular phones. The cellular phones comprise monitors on which the obtained textual information is displayed. There is a problem that the cellular phones have limitations on the volume of textual information displayed on the monitors (namely, the number of characters, such as alphabetic, numerals and symbols) because the monitors do not have large display areas. Accordingly, textual information containing a small number of characters (such as e-mails) can be displayed on the monitors such that users will not have any serious inconvenience in reading the displayed textual information. However, it is impossible to display all of the textual information on the monitor at once. If desired, it is necessary to browse the textual information where there is a large number of characters (such as web pages in a web site) to pick up some or all of the information. In that case, the user has to scroll through a massive amount of textual information again and again. This results in time- and labor-consuming operations for the user.

To avoid scrolling through the textual information, the textual information is usually converted into HTML (Hypertext Markup Language) or XML (Extended Markup Language) format, thereby giving an abridgment of the textual information. In this case, it is not necessary to scroll the textual information again and again, but it is impossible to view the missing information, which has been omitted during abridging the textual information, even if the users desire to do so.

SUMMARY OF THE INVENTION

In the view of the foregoing, the invention has been developed to resolve the above-mentioned and other problems.

According to one aspect of the invention, there is provided a communication system comprising a client device, a first information transmitting device and a second information transmitting device. The client device comprises a textual information request unit that makes a request for at least one piece of textual information, a textual information receive unit that receives an abridged version of the requested textual information, a display unit that displays the abridged version of the requested textual information, a voice information request unit that makes a request for voice information corresponding to an unabridged version of the requested textual information, a voice information receive unit that receives the voice information, and a reproducing unit that reproduces the voice information. The first information transmitting device comprises a request information receive unit that receives the unabridged version of the textual information, an abridging unit that abridges the unabridged version of the textual information received by the request information receive unit and produces the abridged version of the textual information, a converting unit that converts the unabridged version of the textual information into the voice information, a textual information transmit unit that transmits the abridged version of the textual information produced by the abridging unit to the textual information receive unit upon request from the textual information request unit, and a voice information transmit unit that transmits the voice information produced by the converting unit upon request from the voice information request unit. The second information transmitting device comprises a storage unit that stores the unabridged version of the textual information and a storage information transmit unit that retrieves, from the storage unit, the unabridged version of the textual information requested by the textual information request unit, and transmits the retrieved unabridged version of the textual information to the request information receive unit.

According to another aspect of the invention, there is provided an information transmitting device, comprising an abridging unit that abridges textual information and produces an abridged version of the textual information, a converting unit that converts the textual information into voice information, and an output unit that outputs at least one of the abridged version of the textual information and the voice information to a client device.

BRIEF DESCRIPTION OF THE DRAWINGS

The above and other objects, features and advantages of the invention will become more apparent from the following description of exemplary embodiments taken in connection with the accompanying drawings in which.

DETAILED DESCRIPTION OF PREFERRED EMBODIMENTS

An explanation will be given of a communication system according to the invention based on the following exemplary embodiments. Herein, the exemplary embodiments are referred to as communication system 1.

Figure 1:
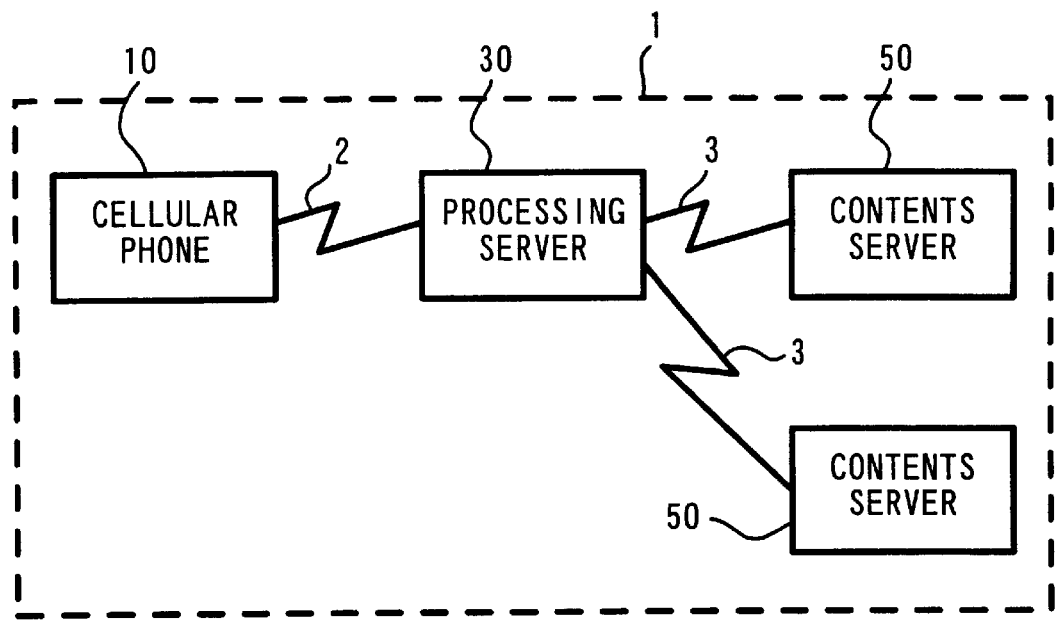
FIG. 1 is a block diagram of a communication system according to a first embodiment of the invention.

Firstly, the main structure of the communication system 1 will be explained in detail according to a first embodiment of the invention. FIG. 1 is a block diagram of the communication system 1 of the first embodiment. The communication system 1 comprises a cellular phone 10 (as a client device), a processing server 30 connectable to the cellular phone 10 via a communication line 2, and contents servers 50 connectable to the processing server 30 via a communication line 3 on the Internet in the first embodiment.

It should be noted that the invention is not limited to the above-described structure of the communication system 1. The communication system 1 may comprise more than one cellular phone 10. The communication system 1 may also comprise more than one processing server 30, and may comprise only one, or more than three, contents server 50.

When the cellular phone 10 makes an information transmitting request to the processing server 30, requesting sending any desired textual information, the processing server 30 passes the information transmitting request to one of the contents servers 50 that stores the requested information as contents therein. The contents are generally configured in a document markup language. In response to the request from the processing server 30, the contents server 50 transmits the corresponding information. Then, the processing server 30 receives the transmitted information, and further transmits the received information to the cellular phone 10.

It is now assumed, in the following explanation, that the cellular phone 10 makes an information transmitting request asking for any content configured in HTML format (hereinafter referred to as HTML content), the contents server 50 stores the HTML content and the processing server 30 processes the contents in HTML format. However, the cellular phone 10 could request and receive any contents configured in another document markup language format. The processing server 30 could also process any contents, transmitted from the contents server 50, in other document markup language format. The contents servers 50 could store and transmit contents configured in other document markup language format. For example, it is possible to apply, as a document markup language, XML, SGML (Standard Generalized Markup Language), or VRML (Virtual Reality Modeling Language) to the invention.

Figure 2A:
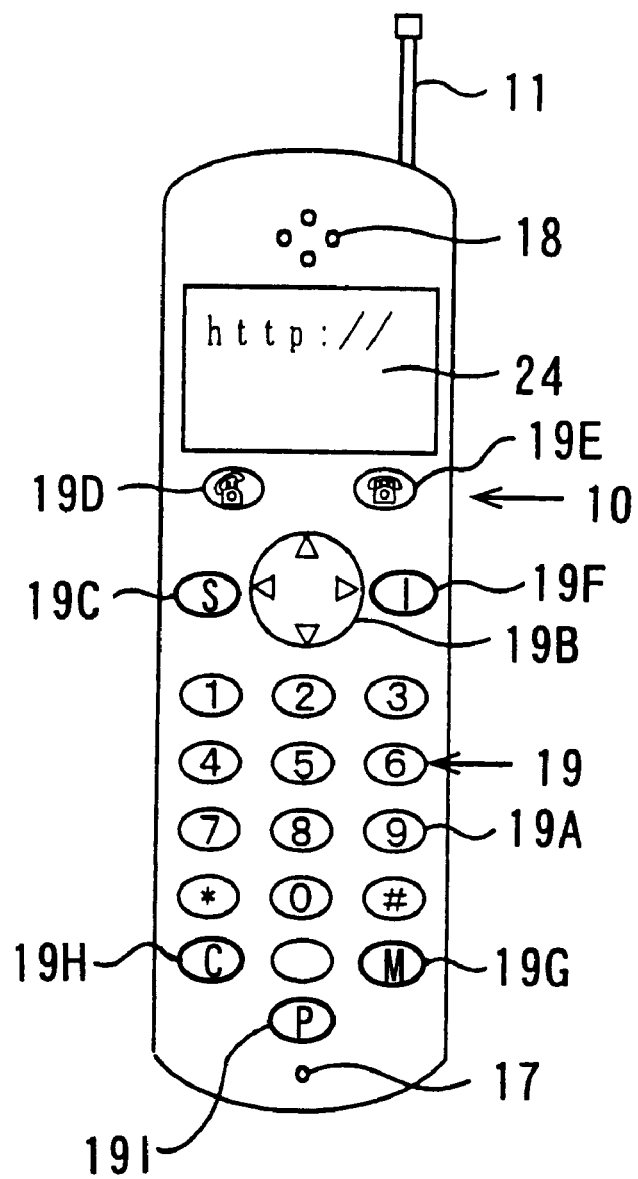
FIG. 2A is a perspective view of a cellular phone (as a client device) applicable to the communication system of the first embodiment of the invention.

Next, the electric structure of the cellular phone 10 will be described with reference to FIGS. 2A to 2C. FIG. 2A is a perspective view of the cellular phone 10. The cellular phone 10 comprises a communication antenna 11, a speaker 18, a LCD (liquid crystal display) 24, a plurality of operation buttons 19, and a microphone 17. The operation buttons 19 include code input buttons 19A, a cursor shift button 19B, a selection button 19C, an off-hook button 19D, an on-hook button 19E, a URL input button 19F, a memory button 19G, a clear button 19H, and a power button 19I.

The code input buttons 19A are used for inputting numerals (0 to 9) and other codes (such as # and *). The code input buttons 19A are also used for inputting characters (such as hiragana characters, katakana characters, alphabet characters and various symbols). E-mail addresses and URL (Uniform Resource Locator) can be input in characters and numerals by using the code input buttons 19A. The cursor shift button 19B is for shifting a cursor up or down, or from side to side on the LCD 24. The selection button 19C is for answering a yes-no question or selecting an item on which the cursor is placed. The off-hook button 19D is pushed for dialing, while the on-hook button 19E is pushed for hang-up. The URL input button 19F is for displaying a URL input screen to input URL. The memory button 19G is used to store, for example, any content transmitted via the processing server 30 from the contents server 50. The clear button 19H is used to clear the input numerals and codes. The power button 19I is for switching the power supply on and off.

Figure 2B:
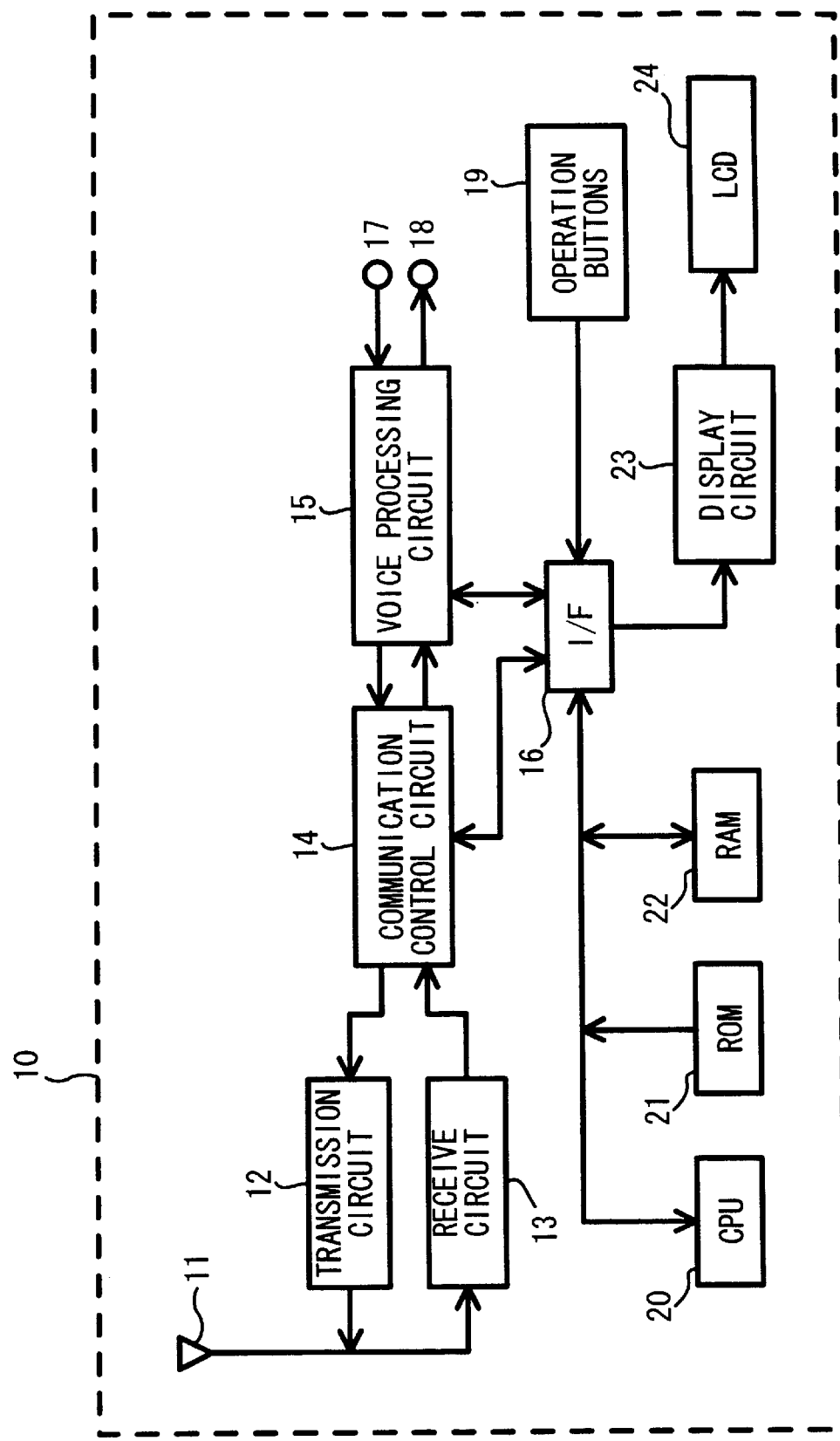
FIG. 2B is a block diagram of the cellular phone of FIG. 2A.

FIG. 2B is a block diagram of the cellular phone 10. The cellular phone 10 comprises a voice processing circuit 15, a communication control circuit 14, a transmission circuit 12, and a receive circuit 13. The voice processing circuit 15 encodes voice input from the microphone 17 into voice information, and decodes and amplifies voice information into voice output. The communication control circuit 14 modulates any transmission information and demodulates any receive information. The transmission circuit 12 transmits the transmission information via the communication antenna 11. The receive circuit 13 receives the receive information via the communication antenna 11.

The cellular phone 10 further comprises an I/F (interface) 16 connected to the communication control circuit 14 and the voice processing circuit 15, a CPU 20 connected to the I/F 16, a ROM 21, a RAM 22 and a display circuit 23 for generating display signals for the LCD 24. The CPU 20 controls various operations, such as communications between the cellular phone 10 and the processing server 30, according to various computer programs stored in the ROM 21. The RAM 22 temporarily stores the receive information and any information processed by the CPU 20.

Figure 2C:
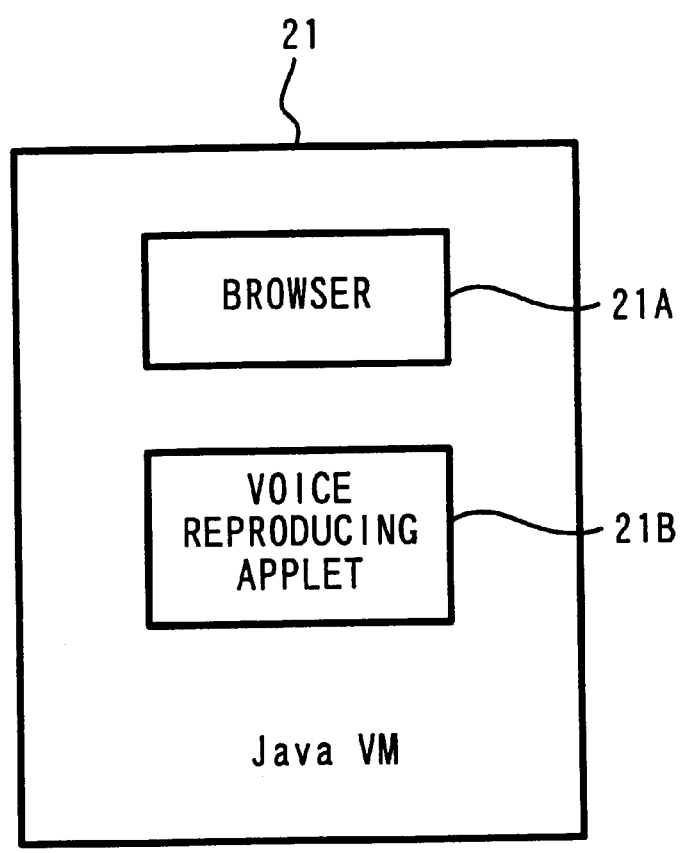
FIG. 2C schematically shows the memory contents in a ROM provided in the cellular phone of FIG. 2A.

FIG. 2C schematically shows memory contents in the ROM 21. The ROM 21 stores a browser 21A, for example, adaptable to Java VM (which is a programming language developed by Sun Microsystems Inc.), and may store a voice reproducing applet 21B used for reproducing the voice information (that has not been packetized).

Figure 3A:
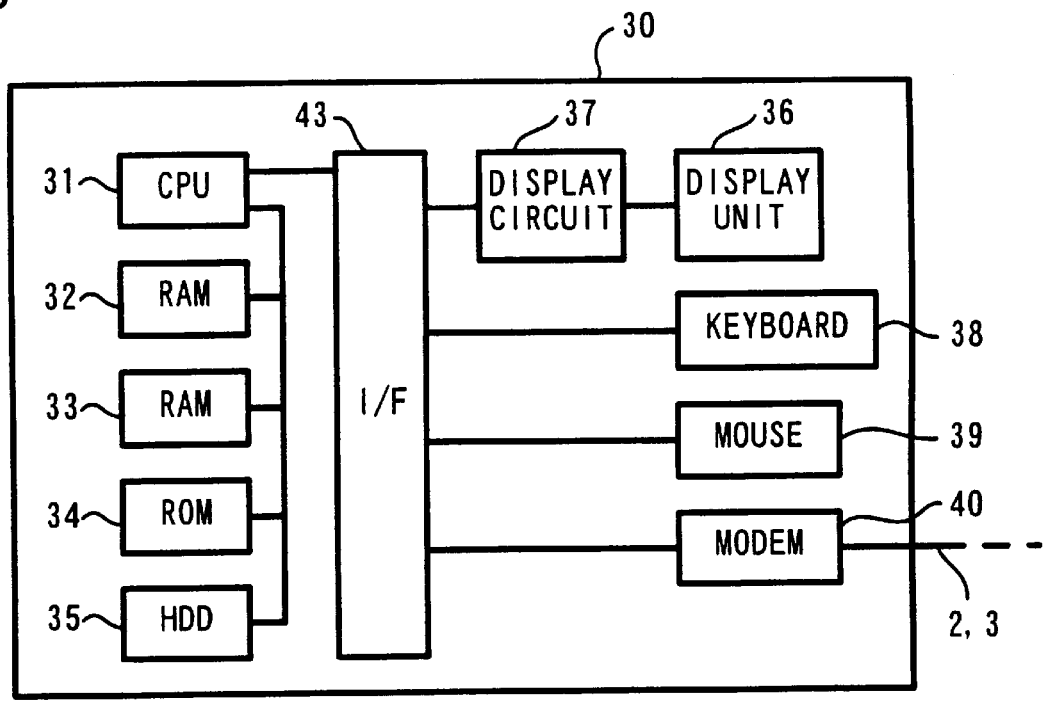
FIG. 3A is a block diagram of a processing server provided in the communication system of the first embodiment of the invention.

The electronic structure of the processing server 30 will be described below with reference to FIGS. 3A and 3B. FIG. 3A is a block diagram of the processing server 30. The processing server 30 comprises a display unit 36 having a LCD or a CRT (cathode-ray tube), a display circuit 37 for generating display signals for the display unit 36, a keyboard 38, a mouse 39, a communication modem 40 and an interface (I/F) 43. The communication modem 40 is connected, via the communication lines 2, 3, to the cellular phone 10 and the contents servers 50, respectively.

The processing server 30 further comprises a CPU 31, a HDD 35, RAM 32, 33, and a ROM 34. The CPU 31 controls various operations, such as communications between the cellular phone 10 and the processing server 30 and between the processing server 30 and the contents server 50, according to various computer programs stored in the ROM 34. The HDD 35 stores various computer programs (described below). The RAM 32, 33 temporarily store the computer programs retrieved from the HDD 35 and any information processed by the CPU 31 and transmitted from the contents server 50.

Figure 3B:
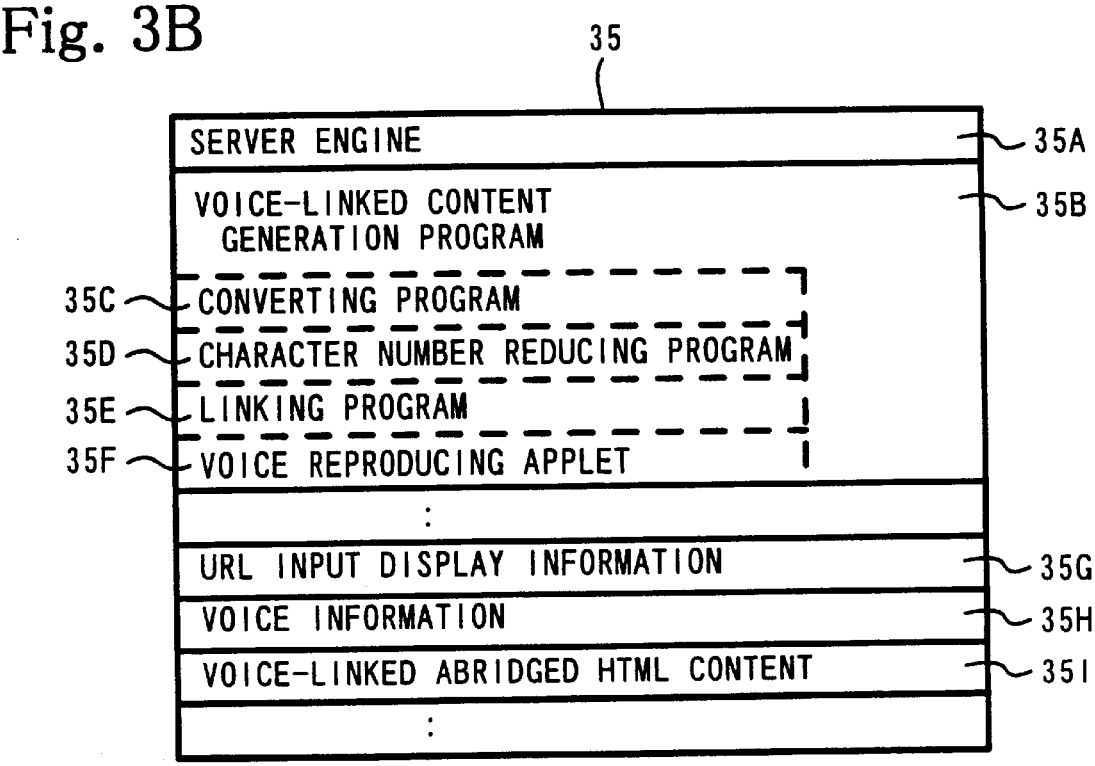
FIG. 3B schematically shows memory contents in a HDD provided in the processing server of FIG. 3A.

FIG. 3B schematically shows memory contents in the HDD 35. The HDD 35 stores a server engine 35A for communicating with the contents server 50 and other processing servers, and a voice-linked content generation program 35B for generating textual information (the HTML content 56B (FIG. 4) transmitted from the contents servers 50 in the embodiments), linked with voice information, in HTML format. The voice-linked content generation program 35B includes a converting program 35C for converting the HTML content 56B into voice information 35H, a character number reducing program 35D for reducing the number of characters in the transmitted HTML content 56B to abridge the HTML content 56B, a linking program 35E for linking the HTML content in which the character number is reduced (hereinafter referred to as abridged HTML content) with voice information to generate voice-linked abridged HTML content 35I, and a voice reproducing applet 35F used for reproducing the voice information (that has not been packetized).

The HDD 35 further stores URL-input display information 35G, configured in HTML format, to transmit at least one URL corresponding to one of a plurality of information items in the contents server 50 according to the information transmitting request from the cellular phone 10. The HDD 35 also stores the voice information 35H generated according to the converting program 35C and the voice-linked abridged HTML content 35I linked with the voice information 35H according to the linking program 35E.

Figure 4:
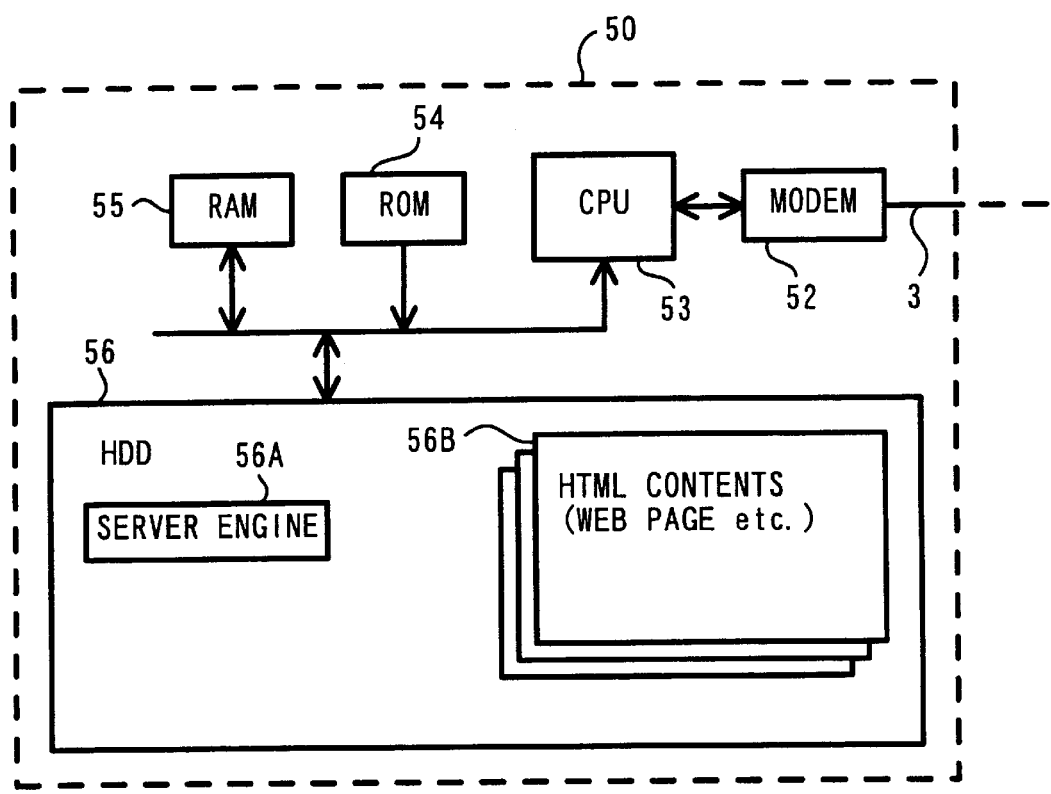
FIG. 4 is a block diagram of a contents server provided in the communication system of the first embodiment of the invention.

The electrical structure of each contents server 50 will be explained below with reference to FIG. 4. Each contents server 50 comprises a HDD 56, a communication modem 52, a CPU 53, a ROM 54 and a RAM 55. The HDD 56 stores various HTML contents 56B (textual information), such as web pages produced in HTML format, and a server engine 56A that retrieves and transmits the HTML content 56B. The communication modem 52 is connected to the processing server 30 via the communication line 3 on the Internet. The CPU 53 controls various operations, such as data retrievals and data communications between the processing server 30 and other contents servers 50, according to various computer programs stored in the ROM 54. The RAM 55 temporarily stores the HTML content 56B retrieved from the HDD 56, and any information processed by the CPU 53.

Figure 5A:
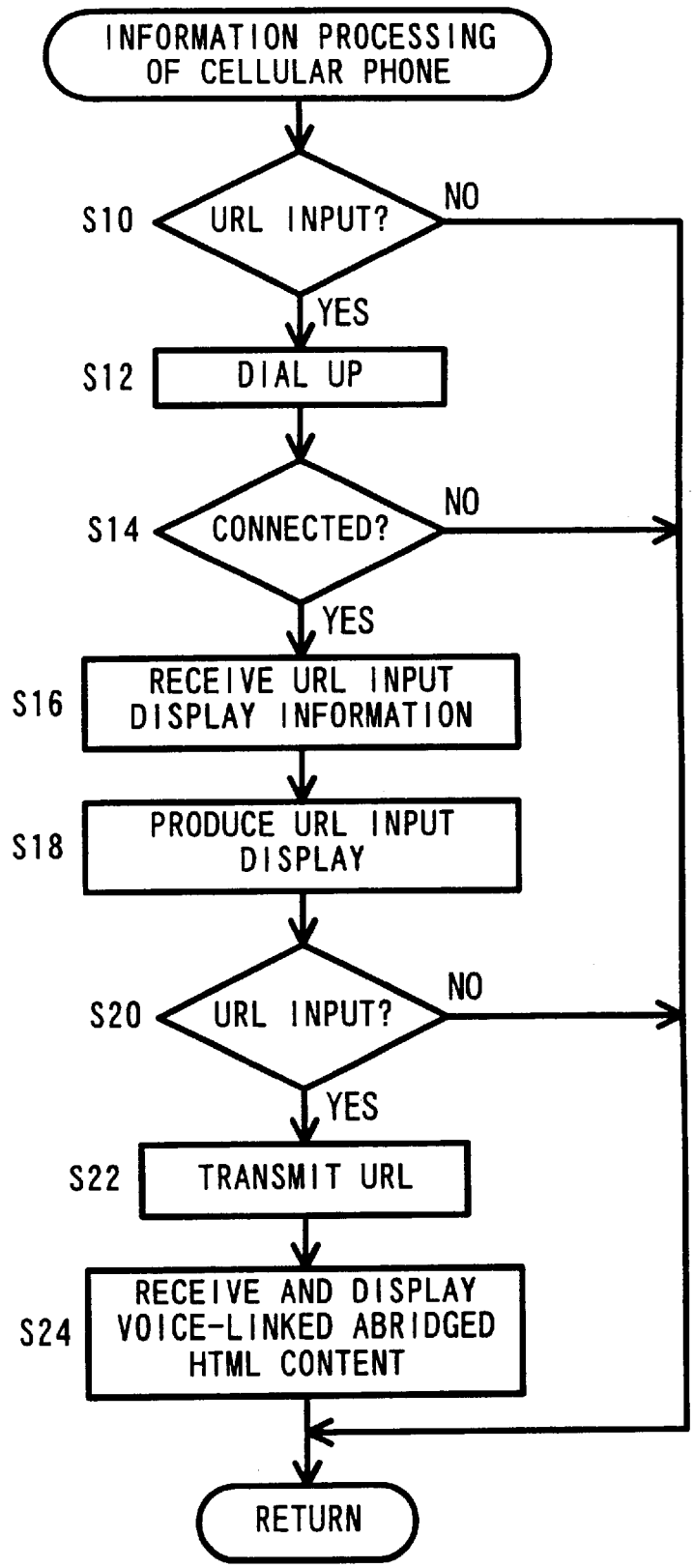
FIGS. 5A and 5B are flowcharts of information processing performed by the cellular phone of FIG. 2A.
Figure 5B:
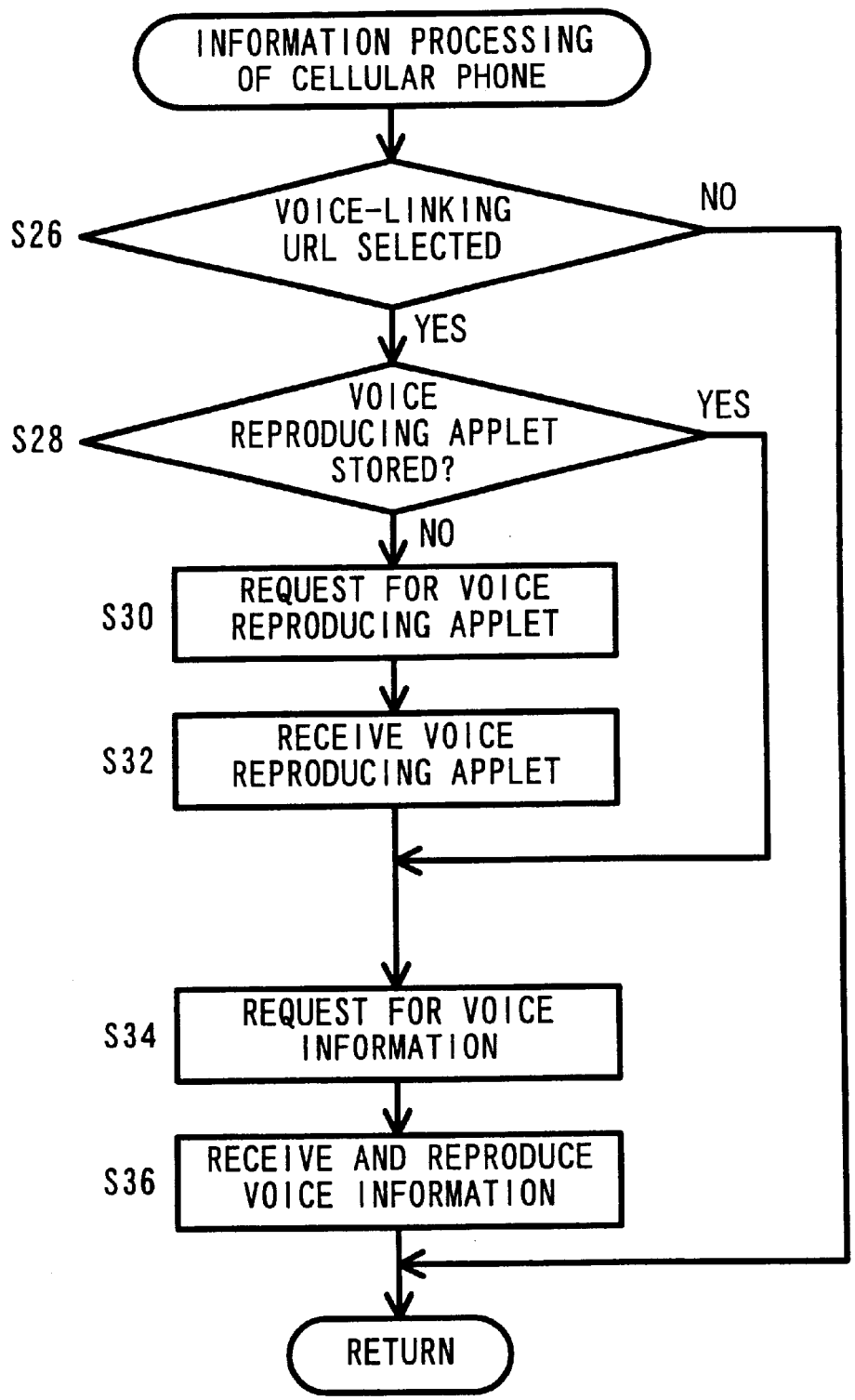
Figure 6:
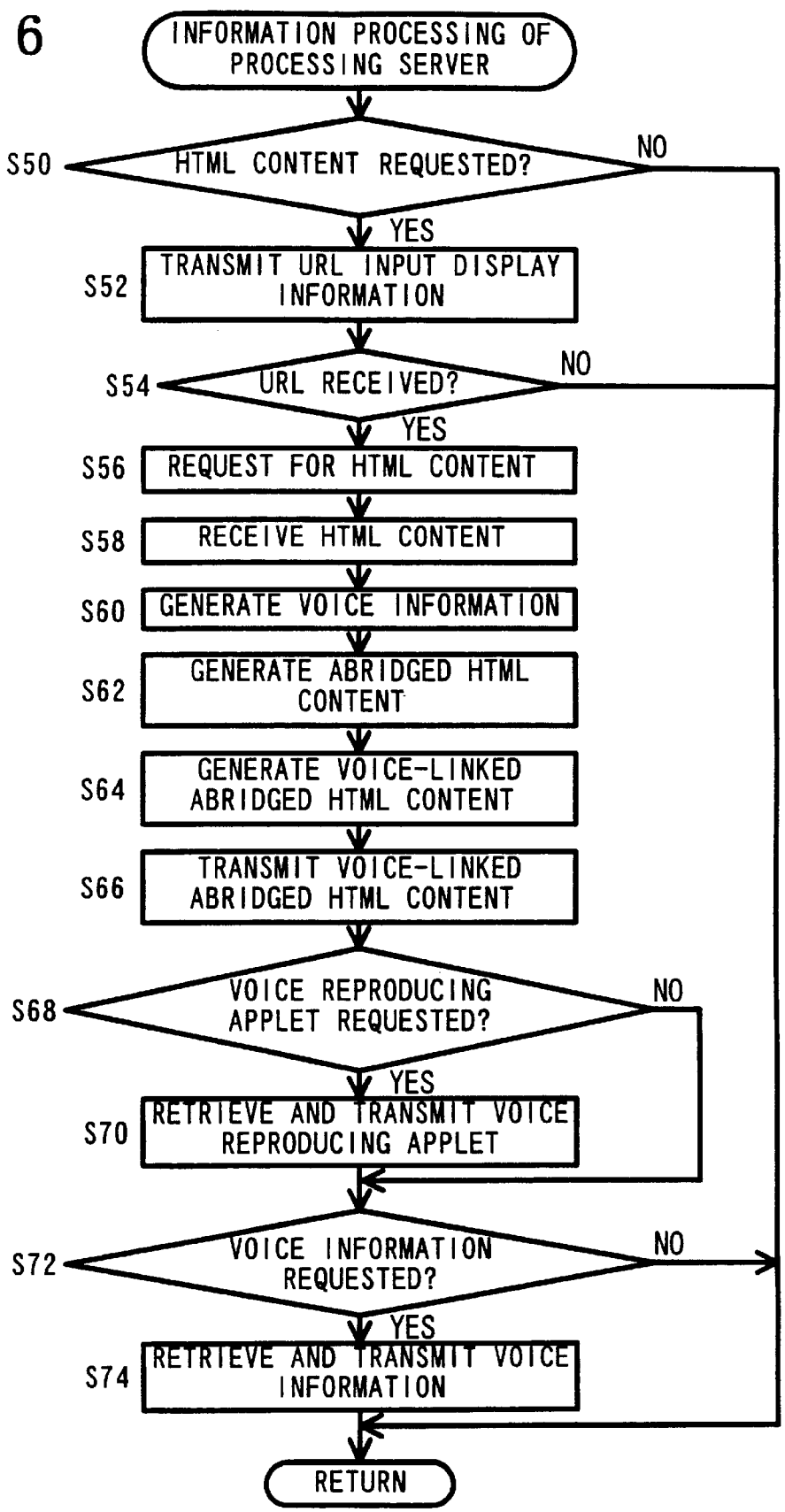
FIG. 6 is a flowchart of information processing performed by the processing server of FIG. 3A.
Figure 7:
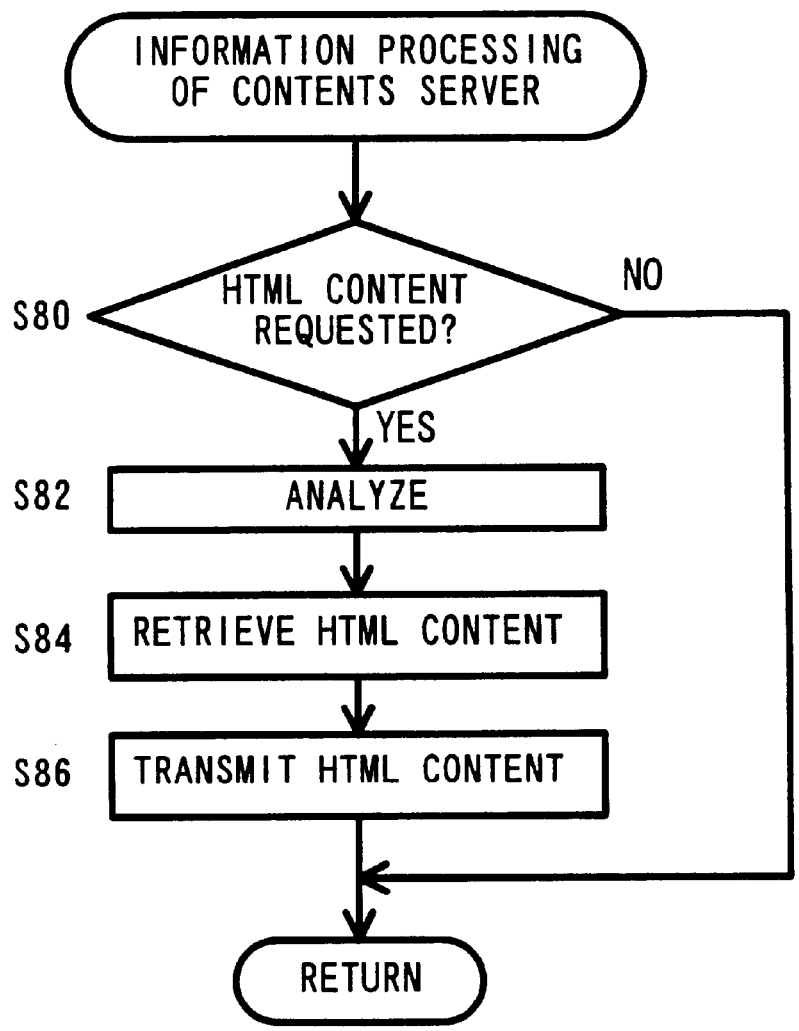
FIG. 7 is a flowchart of information processing performed by the contents server of FIG. 4.

The information processing of the cellular phone 10, the processing server 30 and the contents server 50 will be explained below in detail with reference to FIGS. 5A, 5B, 6 and 7. FIGS. 5A, 5B, 6 and 7 are flowcharts of information processing performed by the cellular phone 10, the processing server 30 and the contents server 50, respectively. Herein, it is noted that steps S10 to S36 of FIGS. 5A and 5B are performed by the cellular phone 10, steps S50 to S74 of FIG. 6 are performed by the processing server 30, and steps S80 to S86 of FIG. 7 are performed by the contents server 50. As described above, it is assumed that the cellular phone 10 requests any HTML contents 56B.

To make an information transmitting request, the CPU 20 of the cellular phone 10 produces a URL input screen display on the LCD 24, indicating, for example, "http://", when the URL input button 19F is pushed by a user. Then, the URL of the processing server 30 is input by using the code input buttons 19A. If there has been previously entered an abbreviated number corresponding to the URL, the URL could be input by inputting the abbreviated number. The off-hook button 19D is pushed to request information transmission, and the CPU 20 determines that the URL of the processing server 30 has been input in step S10. The CPU 20 dials the processing server 30, designated by the input URL, in step S12, and stands ready until connected to the processing server 30 via the communication line 2 in step S14.

Correspondingly, the CPU 31 of the processing server 30 receives the information transmitting request from the cellular phone 10 in step S50. Then, the CPU 31 retrieves the URL-input display information 35G from the HDD 35 and transmits the retrieved URL-input display information 35G to the cellular phone 10 in step S52.

The CPU 20 of the cellular phone 10 receives the URL-input display information 35G transmitted from the processing server 30 in step S16, and produces a URL input display based on the received URL-input display information 35G on the LCD 24 in step S18. The URL-input display indicates at least one URL corresponding to one of a plurality of information items (such as leisure activities, sports, news, travelling, airline and railway services, and the stock market). One of the plurality of information items is selected at the user's request by using the cursor shift buttons 19B and the selection button 19C on the URL input display. Then, the CPU 20 determines that the URL corresponding to the desired information has been selected in step S20, and transmits the selected URL to the processing server 30 in step S22.

The CPU 31 of the processing server 30 receives the URL transmitted from the cellular phone 10 in step S54. Then, in step S56, the CPU 31 transmits the information transmitting request to ask for HTML content 56B corresponding to the received URL to the contents server 50 that stores the requested content.

The CPU 53 of the contents server 50 receives the information transmitting request from the processing server 30 in step S80. The CPU 53 analyzes the request in step S82. The CPU 53 retrieves, based on the analytical result, the HTML content 56B (such as a web page) corresponding to the request from the HDD 56 in step S84. In step S86, the CPU 53 transmits the retrieved HTML content 56B to the processing server 30.

The CPU 31 of the processing server 30 receives, in step S58, the HTML content 56B transmitted from the contents server 50. Then, the CPU 31 converts the received HTML content 56B into voice information 35H according to the converting program 35C in step S60. The voice information 35H is stored in the HDD 35. Next, the CPU 31 reduces the number of characters in the received HTML content 56B according to the character number reducing program 35D, thereby generating abridged HTML content, in step S62. In step S64, the CPU 31 links the abridged HTML content with the voice information 35H according to the linking program 35E and generates voice-linked abridged HTML content 35I in HTML format. The voice-linked abridged HTML content 35I includes a URL indicative of a link to the voice information 35H (hereinafter referred to as a voice-linking URL), and is stored in the HDD 35. The CPU 31 transmits the voice-linked abridged HTML content 35I to the cellular phone 10 in step S66.

In step S24, the CPU 20 of the cellular phone 10 receives the voice-linked HTML content 35I transmitted from the processing server 30, and produces a display of the received voice-linked HTML content 35I on the LCD 24.

In some cases, it is desired to learn the whole of the HTML content 56B that has been requested and without reduction in the number of characters. In this case, to obtain the whole of the HTML content 56B, the user selects the voice-linking URL among the voice-linked abridged HTML content 35I.

The CPU 20 determines, in step S26, whether the voice-linking URL is selected among the voice-linked abridged HTML content 35I. If Yes in step S26, the CPU 20 further determines whether the voice reproducing applet 21B is stored in the ROM 21 in step S28. If Yes in step S28, the CPU 20 moves to step S34. If No in step S28, the CPU 20 requests the voice reproducing applet from the processing server 30.

The CPU 31 of the processing server 30 receives the request asking for the applet from the cellular phone 10 in step S68. The CPU 31 retrieves the voice reproducing applet 35F from the HDD 35 and transmits the retrieved voice reproducing applet 35F to the cellular phone 10 in step S70.

In step S32, the cellular phone 10 receives the voice reproducing applet 35F transmitted from the processing server 30 and stores the voice reproducing applet 35F in the RAM 22. Then, the CPU 20 requests, of the processing server 30, for the voice information 35H in step S34.

The CPU 31 of the processing server 30 receives the request asking for the voice information 35H from the cellular phone 10 in step S72. In step S74, the CPU 31 retrieves the voice information 35H from the HDD 35, and transmits the retrieved voice information 35H to the cellular phone 10.

The CPU 20 of the cellular phone 10 receives and reproduces the voice information 35H transmitted from the processing server 30 according to the voice reproducing applet 21A or 35F, thereby outputting the voice from the speaker 18, in step S36.

As described above, it is possible to provide the abridgement of the requested textual information for the cellular phone 10 so that the abridgement is displayed and viewed with great ease, according to the first embodiment of the invention. In addition, according to the first embodiment of the invention, it is possible to provide, at user's request, the voice information corresponding to the unabridged textual information, so that the whole content of the requested information is made available without omission.

Alternatively, the contents server 50 could be configured to perform at least one of the character number reducing process (namely, the preparation of abridged HTML content), the linking between the abridged HTML content and the voice information, the storage and transmission of the voice reproducing applet, the transmission of voice information, and the transmission of voice-linked abridged HTML content. Also, the cellular phone 10 may request the contents server 50 to transmit the desired HTML content 56B to the processing server 30. In such cases, the cellular phone 10 directly contacts with the contents server 50 as required.

In a few cases, the cellular phone 10 may store the HTML content therein, transmit the HTML content and request the processing server 30 to convert the HTML content into voice information, at the same time, to abridge the textual information and to send at least the abridged HTML content, a voice-linking URL and the voice information back to the cellular phone 10.

Next, the communication system 1 of a second embodiment of the invention will be described below, wherein like parts and components are designated by the same reference numerals, to avoid duplicating the description. As to a further discussion of the second embodiment, the same should be apparent from the above description. Accordingly, no further detailed discussion relating to the structure and operation of the communication system 1 of the second embodiment will be provided.

The communication system 1 of the second embodiment comprises only the cellular phone 10 (as a client device) and the processing server 30, and does not include the contents servers 50.

Figure 8:
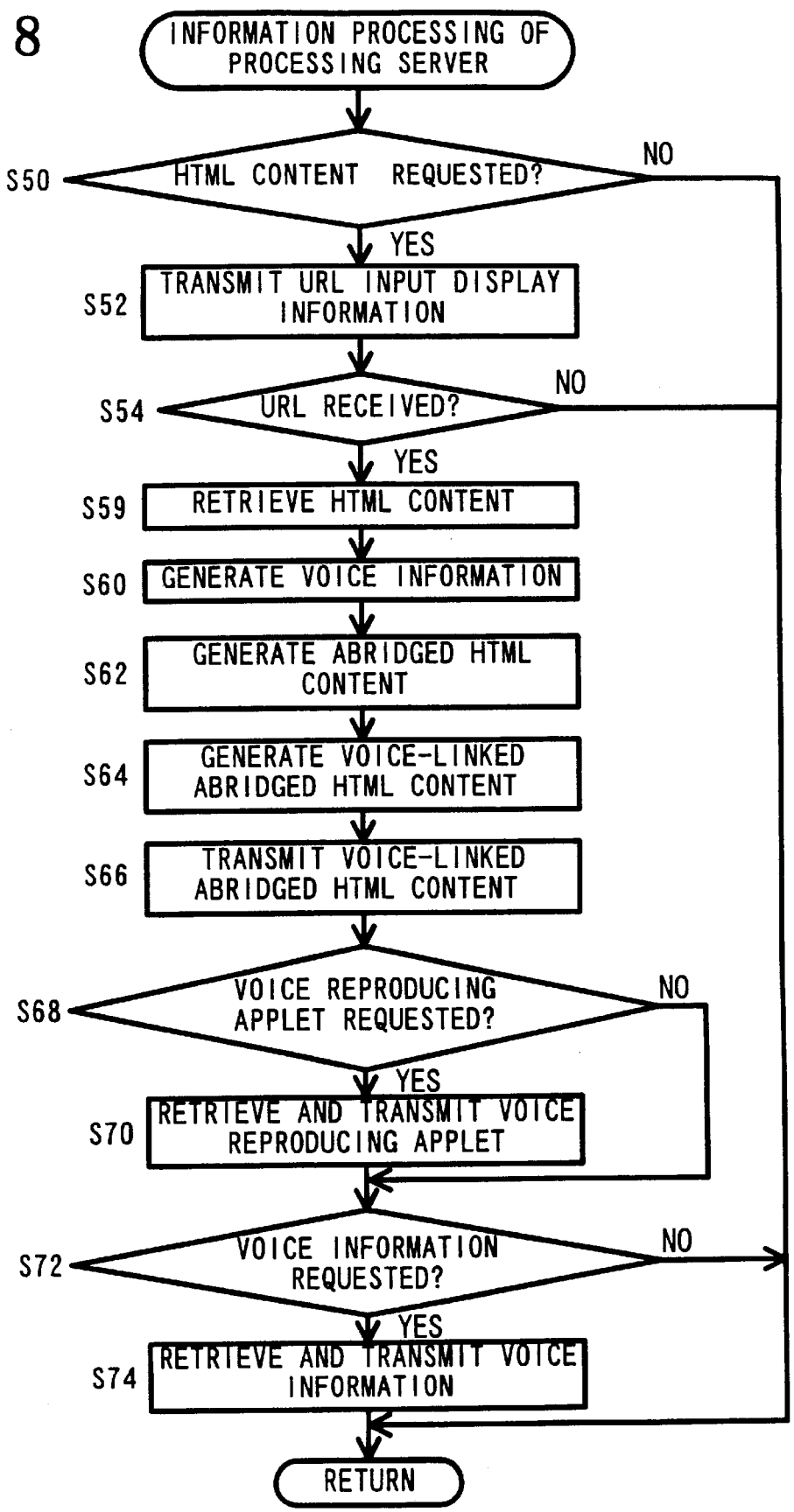
FIG. 8 is a flowchart of information processing performed by a processing server provided in a communication system according to a second embodiment of the invention.

FIG. 8 is a flowchart of image processing performed by the processing server 30 according to the second embodiment. Generally, the cellular phone 10 of this embodiment has the same structure as the above-described embodiment and performs the same information processing as shown in FIGS. 5A and 5B. The processing server 30 of this embodiment stores various HTML contents 56B in the HDD 35 and performs image processing as shown in FIG. 8.

When the URL corresponding to the desired textual information is transmitted from the cellular phone 10 in step S54, the CPU 31 searches for and retrieves the HTML content 56B corresponding to the transmitted URL from the HDD 35 in step S59. Then, the CPU 31 converts the retrieved HTML content 56B into the voice information according to the converting program 35C in step S60, and produces the abridged HTML content according to the character number reducing program 35D in step S62.

As described above, it is therefore possible to provide the requested information for the cellular phone 10 faster according to the second embodiment than the first embodiment, as there is no necessity for communication between the processing server 30 and the contents server 50.

Next, the communication system 1 of a third embodiment of the invention will be described below, wherein like parts and components are designated by the same reference numerals, to avoid duplicating the description. As to a further discussion of the third embodiment, the same should be apparent from the above description.

The communication system of the third embodiment comprise a cellular phone 10 (as a client device), a processing server 30 and contents servers 50. The processing server 30 has a structure as shown in FIG. 3A, but does not necessarily store the voice reproducing applet 35F in the HDD 35. As an alternative, the CPU 31 has a function of packetizing the voice information generated according to the converting program 35C, thereby generating the voice packet information.

Figure 9:
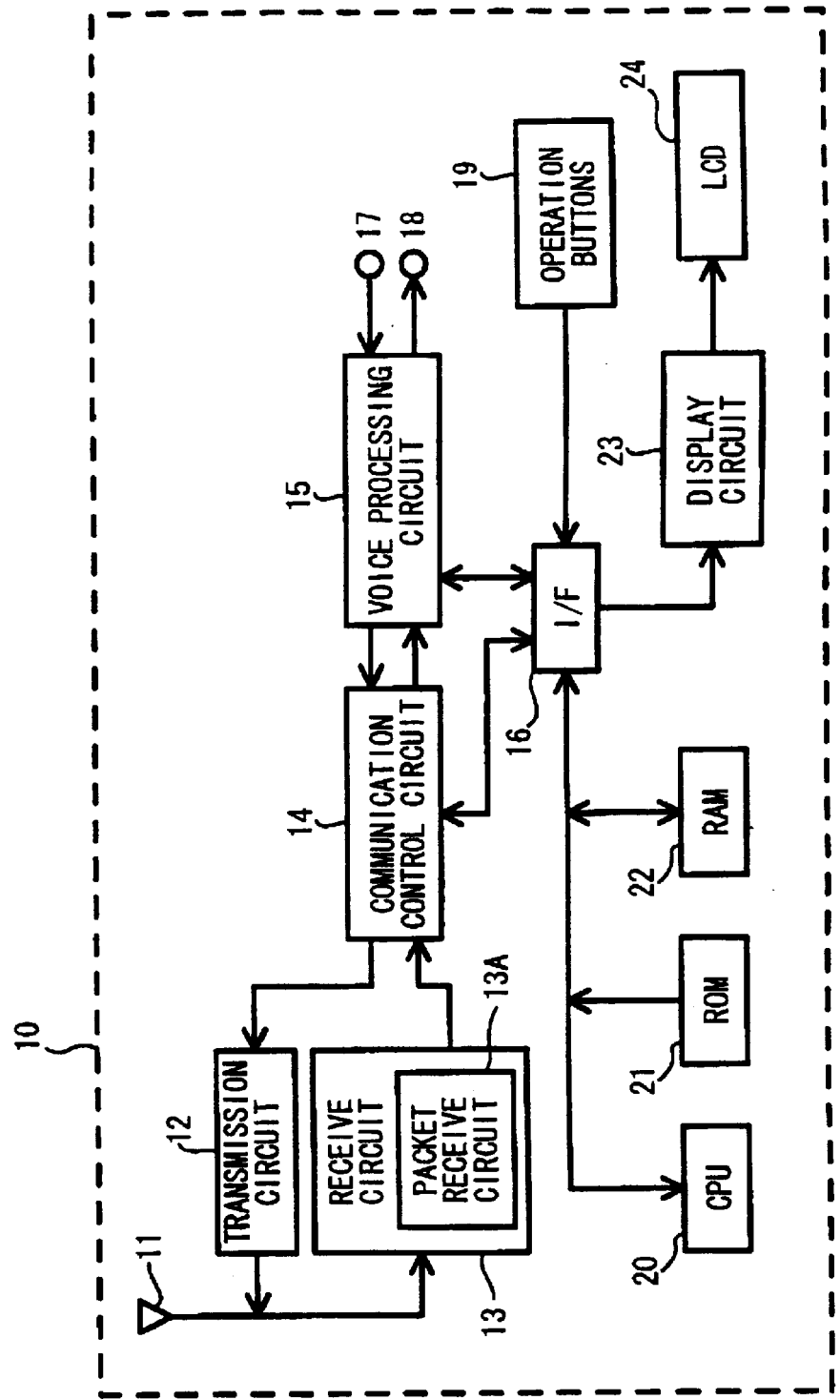
FIG. 9 is a block diagram of a cellular phone (as a client device) applicable to a communication system according to a third embodiment of the invention.

FIG. 9 is a block diagram of the cellular phone 10 according to the third embodiment of the invention. The receive circuit 13 comprises a packet receive circuit 13A for receiving any packetized data including the voice packet information. In this case, there is no need that the cellular phone 10 stores the voice reproducing applet 21A therein or receives the voice reproducing applet 35F from the processing server 30.

That is, the voice packet information is transmitted across packet-switched network. In the packet-switched network, one communication line could be time-shared between the processing server 30 and a plurality of cellular phones 10. Thus, various pieces of the voice information could be simultaneously transmitted from the processing server 30 to the plurality of cellular phones 10, respectively, via one single communication line. The utilization of communication line becomes very high and efficient in this embodiment.

As described above, it becomes possible to transmit the voice information from the processing server 30 to the plurality of cellular phones 10 via one single communication line 2 simultaneously and efficiently according to the third embodiment of the invention.

In addition to the above-described embodiments, the processing server 30 may further store a language identification program in the HDD 35, so that the CPU 31 of the processing server 30 can identify a language in which the HTML content 56B transmitted from the contents server 50 is published. The CPU 31 produces the voice information output in the identified language.

Further, the processing server 30 may store a translation program in the HDD 35, so that the CPU 31 can translate the HTML content 56B from the identified language according to the language identification program into any language requested from the cellular phone, and provide the textual information and the voice information in the requested language.

The character number reducing program 35D could be structured so as to leave first one or more lines (for example, one line) of each chapter (or, section, paragraph) or a predetermined number of characters (for example, 100 characters) in each text block of the HTML content 56B, and to delete the rest. Alternatively, the character number reducing program 35 could be structured so as to not reduce the character number of the text block of the HTML content 56B, when the CPU 31 determines that the text block includes a linking to another HTML content 56B.

In contrast to the above-described embodiments, the voice information and the abridged HTML content may not be linked with each other. For example, the cellular phone 10 could comprise a voice request button. When the voice request button is pushed, the cellular phone 10 requests the voice information from the processing server 30.

Although the invention has been described through the three embodiments, it should be understood that it is intended to cover all changes and modifications of the embodiments of the invention herein used for the purpose of the disclosure, which do not constitute departures from the spirit and scope of the invention.

For example, the client device may be any other portable communication apparatus, such as a notebook computer and a pocket computer, although the client device of the above-mentioned embodiments is a cellular phone. The communication lines of the above-described embodiments are not limited to a public communication network or the Internet. It is therefore possible to apply any other present or prospective communication medium to the invention.

What is claimed is:

1. A communication system, comprising:
   a client device, comprising:
      a textual information request unit that makes a request for at least one piece of textual information;
      a textual information receive unit that receives an abridged version of the requested textual information;
      a display unit that displays the abridged version of the requested textual information;
      a voice information request unit that makes a request for voice information corresponding to an unabridged version of the requested textual information;
      a voice information receive unit that receives the voice information; and
      a reproducing unit that reproduces the voice information;
   a first information transmitting device, comprising:
      a request information receive unit that receives the unabridged version of the textual information;
      an abridging unit that abridges the unabridged version of the textual information received by the request information receive unit and produces the abridged version of the textual information;
      a converting unit that converts the unabridged version of the textual information into the voice information;
      a textual information transmit unit that transmits the abridged version of the textual information produced by the abridging unit to the textual information receive unit upon request from the textual information request unit;
      a voice information transmit unit that transmits the voice information produced by the converting unit upon request from the voice information request unit; and
   a second information transmitting device, comprising:
      a storage unit that stores the unabridged version of the textual information; and
      a storage information transmit unit that retrieves, from the storage unit, the unabridged version of the textual information requested by the textual information request unit, and transmits the retrieved unabridged version of the textual information to the request information receive unit.

2. The communication system as claimed in claim 1, wherein the first information transmitting device comprises a transmission request unit that requests the second information transmitting unit to transmit the unabridged version of the textual information thereto upon request from the textual information request unit.

3. The communication system as claimed in claim 1, wherein the voice information request unit comprises a signal generator that generates a voice information transmission request signal for locating the voice information, and the voice information transmit unit transmits the voice information upon receipt of the transmission request signal.

4. The communication system as claimed in claim 3, wherein the first information transmitting device further comprises a linking unit that links the voice information with the abridged version of the textual information, and produces linking information indicative of a link between the voice information and the abridged version of the textual information.

5. The communication system as claimed in claim 4, wherein the first information transmitting device further comprises a linking information transmit unit that transmits the linking information, the client device further comprises a linking information receive unit that receives the linking information, and the display unit also displays the linking information received by the linking information receive unit.

6. The communication system as claimed in claim 4, wherein the signal generator generates the transmission request signal based on the linking information.

7. The communication system as claimed in claim 1, wherein at least one of the textual information request unit and the voice information request unit is operable by an operator.

8. The communication system as claimed in claim 1, wherein the converting unit further comprises a packetizing unit that packetizes the voice information, the voice information transmit unit transmits the packetized voice information, the voice data receive unit receives the packetized voice information, and the reproducing unit reproduces the packetized voice information.

9. A communication system, comprising:
   a client device, comprising:
      a textual information request unit that makes a request for at least one piece of textual information;
      a textual information receive unit that receives an abridged version of the requested textual information;
      a display unit that displays the abridged version of the requested textual information;
      a voice information request unit that makes a request for voice information corresponding to an unabridged version of the requested textual information;
      a voice information receive unit that receives the voice information; and
      a reproducing unit that reproduces the voice information; and
   a first information transmitting device, comprising:

a storage unit that stores the unabridged version of the textual information;

a retrieving unit that retrieves, from the storage unit, the unabridged version of the textual information upon request from the textual information request unit;

an abridging unit that abridges the unabridged version of the textual information received by the request information receive unit and produces the abridged version of the textual information;

a converting unit that converts the unabridged version of the textual information into the voice information;

a textual information transmit unit that transmits the abridged version of the textual information produced by the abridging unit to the textual information receive unit upon request from the textual information request unit; and a voice information transmit unit that transmits the voice information produced by the converting unit upon request from the voice information request unit.

10. The communication system as claimed in claim 9, wherein the voice information request unit comprises a signal generator that generates a voice information transmission request signal for locating the voice information, and the voice information transmit unit transmits the voice information upon receipt of the transmission request signal.

11. The communication system as claimed in claim 10, wherein the first information transmitting device further comprises a linking unit that links the voice information with the abridged version of the textual information, and produces linking information indicative of a link between the voice information and the abridged version of the textual information.

12. The communication system as claimed in claim 11, wherein the first information transmitting device further comprises a linking information transmit unit that transmits the linking information, the client device further comprises a linking information receive unit that receives the linking information, and the display unit also displays the linking information received by the linking information receive unit.

13. The communication system as claimed in claim 11, wherein the signal generator generates the transmission request signal based on the linking information.

14. The communication system as claimed in claim 9, wherein at least one of the textual information request unit and the voice information request unit is operable by an operator.

15. The communication system as claimed in claim 9, wherein the converting unit further comprises a packetizing unit that packetizes the voice information, the voice information transmit unit transmits the packetized voice information, the voice data receive unit receives the packetized voice information, and the reproducing unit reproduces the packetized voice information.

* * * * *